US008913197B2

(12) United States Patent
Takashimizu et al.

(10) Patent No.: US 8,913,197 B2
(45) Date of Patent: *Dec. 16, 2014

(54) DIGITAL BROADCAST RECEIVER UNIT

(71) Applicants: Satoru Takashimizu, Yokohama (JP); Kenji Katsumata, Yokohama (JP); Yuji Yamamoto, Yokohama (JP); Satoshi Iimuro, Yokohama (JP); Takanori Eda, Yokohama (JP); Shuko Sei, Yokohama (JP)

(72) Inventors: Satoru Takashimizu, Yokohama (JP); Kenji Katsumata, Yokohama (JP); Yuji Yamamoto, Yokohama (JP); Satoshi Iimuro, Yokohama (JP); Takanori Eda, Yokohama (JP); Shuko Sei, Yokohama (JP)

(73) Assignee: Hitachi Maxell, Ltd., Osaka Prefecture (JP)

( * ) Notice: Subject to any disclaimer, the term of this patent is extended or adjusted under 35 U.S.C. 154(b) by 0 days.
This patent is subject to a terminal disclaimer.

(21) Appl. No.: 13/731,215

(22) Filed: Dec. 31, 2012

(65) Prior Publication Data
US 2013/0113995 A1 May 9, 2013

Related U.S. Application Data

(63) Continuation of application No. 13/022,971, filed on Feb. 8, 2011, now Pat. No. 8,345,168, and a
(Continued)

(30) Foreign Application Priority Data
Aug. 21, 1997 (JP) ....................... 9-224605

(51) Int. Cl.
*H04N 5/44* (2011.01)
(52) U.S. Cl.
USPC .......................................................... 348/725
(58) Field of Classification Search
USPC ......... 348/725, 552, 553, 558, 556, 723, 446, 348/441, 448
See application file for complete search history.

(56) References Cited

U.S. PATENT DOCUMENTS

| 4,994,912 A | 2/1991 | Lumelsky et al. |
| 5,128,747 A | 7/1992 | Isnardi et al. |

(Continued)

FOREIGN PATENT DOCUMENTS

| EP | 691792 | 1/1996 |
| JP | 5-64167 | 3/1993 |

(Continued)

OTHER PUBLICATIONS

Abridgment of HDMI standard (see relation of EIA/CIA-861 B), Jan. 2003.

(Continued)

*Primary Examiner* — Paulos M Natnael
(74) *Attorney, Agent, or Firm* — Antonelli, Terry, Stout & Kraus, LLP.

(57) ABSTRACT

Digital broadcast receiving apparatus including: a receiver receiving at least three different video programs in one transport stream, including a plurality of different video signal formats having different combination of scan lines and scan method; an isolator to isolate a video signal; a decoder to decode the video signal; a processor to execute a plurality of video processing sub software programs, providing video processing according to a different combination of the number of scan lines and a scan method; a controller using information obtained from the digital multiplexed signal to determine a combination of the number of scan lines and a scan method, and selecting one video processing of the video processing sub software programs to perform video processing according to the determined combination of the number of scan lines and the scan method; and a display to display the video signal processed by the processor.

36 Claims, 11 Drawing Sheets

Related U.S. Application Data continuation of application No. 12/196,640, filed on Aug. 22, 2008, now Pat. No. 7,889,281, and a continuation of application No. 11/024,874, filed on Dec. 30, 2004, now Pat. No. 7,436,458, and a continuation of application No. 10/725,456, filed on Dec. 3, 2003, now Pat. No. 7,173,674, and a continuation of application No. 10/376,231, filed on Mar. 3, 2003, now abandoned, and a continuation of application No. 09/135,727, filed on Aug. 18, 1998, now Pat. No. 6,549,243.

(56) References Cited

U.S. PATENT DOCUMENTS

| | | | |
|---|---|---|---|
| 5,139,707 A | | 8/1992 | Guglielmetti et al. |
| 5,187,575 A | | 2/1993 | Lim |
| 5,218,436 A | | 6/1993 | Sugiyama et al. |
| 5,241,382 A | | 8/1993 | Paik et al. |
| 5,315,400 A | | 5/1994 | Kurata et al. |
| 5,319,453 A | | 6/1994 | Copriviza et al. |
| 5,319,707 A | | 6/1994 | Wasilewski et al. |
| 5,359,694 A | | 10/1994 | Concordel |
| 5,400,401 A | | 3/1995 | Wasilewski et al. |
| 5,444,491 A | | 8/1995 | Lim |
| 5,459,523 A | | 10/1995 | Tanaka |
| 5,485,216 A | | 1/1996 | Lee |
| 5,502,497 A | | 3/1996 | Yamaashi et al. |
| 5,519,446 A | | 5/1996 | Lee |
| 5,530,484 A | | 6/1996 | Bhatt et al. |
| 5,568,184 A | | 10/1996 | Shibata et al. |
| 5,589,886 A | | 12/1996 | Ezaki |
| 5,596,753 A | | 1/1997 | Bhatt |
| 5,600,573 A | | 2/1997 | Hendricks et al. |
| 5,610,661 A | * | 3/1997 | Bhatt ............................ 348/446 |
| 5,627,602 A | | 5/1997 | Nio et al. |
| 5,666,170 A | | 9/1997 | Stewart |
| 5,666,487 A | | 9/1997 | Goodman et al. |
| 5,675,390 A | | 10/1997 | Schindler et al. |
| 5,703,658 A | | 12/1997 | Tsuru et al. |
| 5,712,689 A | | 1/1998 | Yasuki et al. |
| 5,717,471 A | | 2/1998 | Stewart |
| 5,734,233 A | * | 3/1998 | Masumoto et al. ...... 315/368.12 |
| 5,747,948 A | | 5/1998 | George |
| 5,754,242 A | | 5/1998 | Ohkami |
| 5,768,539 A | | 6/1998 | Metz et al. |
| 5,796,442 A | | 8/1998 | Gove et al. |
| 5,828,403 A | | 10/1998 | DeRodeff et al. |
| 5,828,788 A | | 10/1998 | Chiang et al. |
| 5,831,690 A | | 11/1998 | Lyons et al. |
| 5,832,085 A | | 11/1998 | Inoue et al. |
| 5,838,383 A | | 11/1998 | Chimoto et al. |
| 5,845,089 A | | 12/1998 | Ohira et al. |
| 5,867,225 A | | 2/1999 | Keating et al. |
| 5,913,038 A | | 6/1999 | Griffiths |
| 5,923,378 A | | 7/1999 | Limberg |
| 5,923,755 A | | 7/1999 | Birch |
| 5,946,052 A | | 8/1999 | Ozkan et al. |
| 5,953,074 A | * | 9/1999 | Reddy ............................ 348/558 |
| 5,963,261 A | | 10/1999 | Dean |
| 5,973,748 A | | 10/1999 | Horiguchi et al. |
| 5,978,855 A | | 11/1999 | Metz et al. |
| 6,005,640 A | | 12/1999 | Strolle et al. |
| 6,040,867 A | | 3/2000 | Bando et al. |
| 6,061,096 A | | 5/2000 | Limberg |
| 6,078,361 A | | 6/2000 | Reddy |
| 6,084,638 A | | 7/2000 | Hare et al. |
| 6,111,613 A | | 8/2000 | Sasano et al. |
| 6,118,486 A | | 9/2000 | Reitmeier |
| 6,137,537 A | | 10/2000 | Tsuji et al. |
| 6,147,712 A | | 11/2000 | Shimamoto et al. |
| 6,148,141 A | | 11/2000 | Maeda et al. |
| 6,181,334 B1 | | 1/2001 | Freeman et al. |
| 6,233,253 B1 | | 5/2001 | Settle et al. |
| 6,256,045 B1 | | 7/2001 | Bae et al. |
| 6,278,736 B1 | | 8/2001 | De Haan et al. |
| 6,356,313 B1 | | 3/2002 | Champion et al. |
| 6,366,326 B1 | | 4/2002 | Ozkan et al. |
| 6,414,952 B2 | | 7/2002 | Foley |
| 6,549,243 B1 | | 4/2003 | Takashimizu et al. |
| 6,577,349 B1 | * | 6/2003 | Yamaguchi et al. .......... 348/556 |
| 6,714,253 B2 | | 3/2004 | Kim et al. |
| 6,788,347 B1 | | 9/2004 | Kim et al. |
| 6,985,189 B1 | | 1/2006 | Takada et al. |
| 7,173,674 B2 | * | 2/2007 | Takashimizu et al. ........ 348/725 |
| 7,436,458 B2 | * | 10/2008 | Takashimizu et al. ........ 348/558 |
| 7,889,281 B2 | * | 2/2011 | Takashimizu et al. ........ 348/725 |
| 8,345,168 B2 | * | 1/2013 | Takashimizu et al. ........ 348/725 |

FOREIGN PATENT DOCUMENTS

| | | |
|---|---|---|
| JP | 8-56365 | 2/1996 |
| JP | 8-79641 | 3/1996 |
| JP | 8-79697 | 3/1996 |
| JP | 8-88836 | 4/1996 |
| JP | 8-98105 | 4/1996 |

OTHER PUBLICATIONS

Abridgment of EIA/CIA-861 B (see contents of Table 13), Jan. 2003.
ISO/IEC 13818-1, MPEG2 Systems, ITU-T Recommendation H.222.0, Jul. 1995.
ISO/IEC 13818-2, MPEG2 video, ITU-T Recommendation H.262, 1995.
SAA7201 Integrated MPEG2 AVG decoder, Philips Semiconductors, Jan. 1997, 36 pgs.
SAA7182; SAA7183 Digital Video Encoder (EURO-DENC), Philips Semiconductors, Jul. 1996, 40 pgs.
Robert E. Keeler, Digital Video in Telecommunications: Interoperability in Multi-Format Digital Video Networks, Digital Video, Concepts and Applications Across Industries, Aug. 16, 1995.
P. Stammnitz et al., Hardware Implementation of the Transport Stream Demultiplexer for the HDTVT Demonstrator, Signal Processing of HDTV, V1, 1995.
Tony Wechselberger, A Compilation of Advanced Television Systems Committee Standards, Apr. 1996.
ATSC Digital Television Standard, Advanced Television Systems Committee, James C. McKinney, Chairman, Dr. Robert Hopkins, Executive Director, Sep. 16, 1995.
Tutorial on the Grand Alliance HDTV System, FCC Field Operations Bureau, Robert Hopkins ATSC, Advanced Television Systems Committee, Jul. 27, 1994.
Digital terrestrial HDTV for North America, The Grand Alliance HDTV system, R. Hopkins (ATSC), EBU Technical Review, Summer 1994.
Guide to the use of the ATSC Digital Television Standard, Advanced Television System Committee, Doc. A/54, Oct. 4, 1995.
Notice of Appeal by Plaintiffs, filed Oct. 17, 2013, 4 pgs.; U.S. District Court, Eastern District, Texas (Marshall Division)—CA 2:10-CV-260-JRG.
Memorandum Opinion and Order, filed Sep. 18, 2013, 23 pgs,; U.S. District Court, Eastern District, Texas (Marshall Division)—CA 2:10-CV-260-JRG.
Final Judgment, filed Sep. 19, 2013, 2 pages,; U.S. District Court, Eastern District, Texas (Marshall Division)—CA 2:10-CV-260-JRG.
Complaint, filed Jul. 22, 2010, 19 pages; U.S. District Court, Eastern District, Texas (Marshall Division)—CA 2:10-CV-260-JRG.
TPV Defendants' Answer to Plaintiffs' Complaint, Affirmative Defenses, and Counter Claims, filed Nov. 29, 2010, 24 pages; U.S. District Court, Eastern District, Texas (Marshall Division)—CA 2:10-CV-260-JRG.
Vizio, Inc.'S Answer to Complaint and Counter Claims, filed Nov. 29, 2010, 29 pages,; U.S. District Court, Eastern District, Texas (Marshall Division)—CA 2:10-CV-260-JRG.
Defendant'S Invalidity Contentions, dated Aug. 3, 2012, 32 pages; U.S. District Court, Eastern District, Texas (Marshall Division)—CA 2:10-CV-260-JRG.
Appendix G to Defendants' Invalidity Contentions, dated Aug. 3, 2012, 15 pages.; U.S. District Court, Eastern District, Texas (Marshall Division)—CA 2:10-CV-260-JRG.

(56) References Cited

OTHER PUBLICATIONS

Defendant's Supplemental Invalidity Contentions< dated Aug. 22, 2012, ; U.S. District Court, Eastern District, Texas (Marshall Division)—CA 2:10-CV-260-JRG.
Plaintiffs Hitachi Consumer Electronics Co. Ltd.'s and Hitachi Advanced Digital, Inc.'s Disclosure of Asserted Claims and Infringement Contentions Under Patent Rule 3-1, dated May 11, 2012, 9 pages,; U.S. District Court, Eastern District, Texas (Marshall Division)—CA 2:10-CV-260-JRG.
Appendix H—Infringement Contentions—USP 6,549,243, dated May 11, 2012, 7 pages.; U.S. District Court, Eastern District, Texas (Marshall Division)—CA 2:10-CV-260-JRG.
Appendix K—Infringement Contentions—USP 7,889,281, dated May 11, 2012, 8 pages,; U.S. District Court, Eastern District, Texas (Marshall Division)—CA 2:10-CV-260-JRG.
First Amended Complaint, dated Jun. 5, 2012, 26 pages,; U.S. District Court, Eastern District, Texas (Marshall Division)—CA 2:10-CV-260-JRG.
Verdict Form, filed Apr. 12, 2013, 5 pages,; U.S. District Court, Eastern District, Texas (Marshall Division)—CA 2:10-CV-260-JRG.
Memorandum Opinion and Order, filed Nov. 13, 2012, 129 pages,; U.S. District Court, Eastern District, Texas (Marshall Division)—CA 2:10-CV-260-JRG.
Complaint, filed May 3, 2012, 11 pages, ; U.S. District Court, Eastern District, Texas (Marshall Division)—CA 2:10-CV-260-JRG.
Hitachi's Motion for Judgment as a Matter of Law Pursuant to Rule 50(B) That the '243 Patent is Infringed, or Alternatively for a New Trial Pursuant to Rule 53(A), filed May 13, 2013, 17 pages, U.S. District Court, Eastern District, Texas (Marshall Division)—CA 2:10-CV-260-JRG. [Trade Secret].
Hitachi's Opposition to TPV's Motion for Entry of Judgment, filed May 13, 2013, 6 pages, U.S. District Court, Eastern District, Texas (Marshall Division)—CA 2:10-CV-260-JRG. [Trade Secret].
Hitachi's Reply Brief in Support of its Motion for Judgment as a Matter of Law Pursuant to Rule 50(b) That the '243 Patent is Infringed, or Alternatively for a New Trial Pursuant to Rule 59(a), filed Jun. 13, 2013, 7 pages,; U.S. District Court, Eastern District, Texas (Marshall Division)—CA 2:10-CV-260-JRG. [Trade Secret].
Defendant's Opposition to Hitachi's Motion for Judgment as a Matter of Law Pursuant to Rule 53(B) That the '243 Patent is Infringed or Alternatively for a New Trial Pursuant to Rule 59(A), filed May 31, 2013, 16 pages, U.S. District Court, Eastern District, Texas (Marshall Division)—CA 2:10-CV-260-JRG. [Trade Secret].
Defendant's Sur-Reply in Opposition to Hitachi's Motion for Judgment as a Matter of Law Pursuant to Rule 50(B) That the '243 Patent is Infringed or Alternatively for a New Trial Pursuant to Rule 59(A), filed Jun. 24, 2013, 6 pages; U.S. District Court, Eastern District, Texas (Marshall Division)—CA 2:10-CV-260-JRG. [Trade Secret].
Brief for Plaintiff's-Appellants Hitachi Consumer Electronics Co., Ltd. and Hitachi Advanced Digital, Inc. , filed Jan. 27, 2014, 212 pages, U.S. District Court, Eastern District, Texas (Marshall Division)—CA 2:10-CV-260-JRG. [Trade Secret].
Videotaped Deposition of Kenji Katsumata, Los Angeles, CA Thursday, Nov. 15, 2012, 136 pages, U.S. District Court, Eastern District, Texas (Marshall Division)—CA 2:10-CV-260-JRG. [Trade Secret].
Hitachi's Objections and Response to TPV's and Vizio's First Set of Common Interrogatories to Hitachi, dated Sep. 20, 2012, 44 pages, U.S. District Court, Eastern District, Texas (Marshall Division)—CA 2:10-CV-260-JRG. [Trade Secret].
Transcript of Jury Trial, Apr. 8, 2013, 8:00 a.m.; pp. 1-154, four pages per page; U.S. District Court, Eastern District, Texas (Marshall Division)—CA 2:10-CV-260-JRG. [Trade Secret].
Transcript of Jury Trial, Apr. 8, 2013, 1:15 a.m.; pp. 1-161, four pages per page; U.S. District Court, Eastern District, Texas (Marshall Division)—CA 2:10-CV-260-JRG. [Trade Secret].
Transcript of Jury Trial, Apr. 9, 2013, 8:30 a.m.; pp. 1-138; U.S. District Court, Eastern District, Texas (Marshall Division)—CA 2:10-CV-260-JRG. [Trade Secret].
Transcript of Jury Trial, Apr. 9, 2013, 1:00 p.m.; pp. 1-198; U.S. District Court, Eastern District, Texas (Marshall Division)—CA 2:10-CV-260-JRG. [Trade Secret].
Transcript of Jury Trial, Apr. 10, 2013, 8:15 a.m.; pp. 1-161; U.S. District Court, Eastern District, Texas (Marshall Division)—CA 2:10-CV-260-JRG. [Trade Secret].
Transcript of Jury Trial, Apr. 10, 2013, 1:00 p.m.; pp. 1-146; U.S. District Court, Eastern District, Texas (Marshall Division)—CA 2:10-CV-260-JRG. [Trade Secret].
Transcript of Jury Trial, Apr. 11, 2013, 8:30 a.m.; pp. 1-131; U.S. District Court, Eastern District, Texas (Marshall Division)—CA 2:10-CV-260-JRG. [Trade Secret].
Transcript of Jury Trial, Apr. 11, 2013, 1:00 a.m.; pp. 1-160; U.S. District Court, Eastern District, Texas (Marshall Division)—CA 2:10-CV-260-JRG. [Trade Secret].
Transcript of Jury Trial, Apr. 12, 2013, 8:30 a.m.; pp. 1-57; U.S. District Court, Eastern District, Texas (Marshall Division)—CA 2:10-CV-260-JRG. [Trade Secret].
Transcript of Jury Trial, Apr. 12, 2013, 11:30 a.m.; pp. 1-109; U.S. District Court, Eastern District, Texas (Marshall Division)—CA 2:10-CV-260-JRG. [Trade Secret].
Brief of Defendants-Appellees, dated Apr. 14, 2014, 70 pages, U.S. District Court, Eastern District, Texas (Marshall Division)—CA 2:10-CV-260-JRG.
Reply Brief for Plaintiffs-Appellants Hitachi Consumer Electronics Co., Ltd. And Hitachi Advanced Digital, Inc., dated May 15, 2012, 42 pages, U.S. District Court, Eastern District, Texas (Marshall Division)—CA 2:10-CV-260-JRG.

* cited by examiner

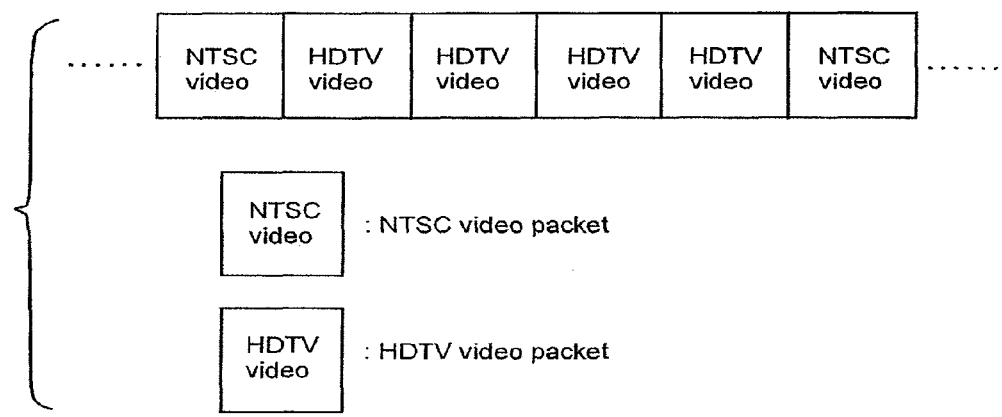

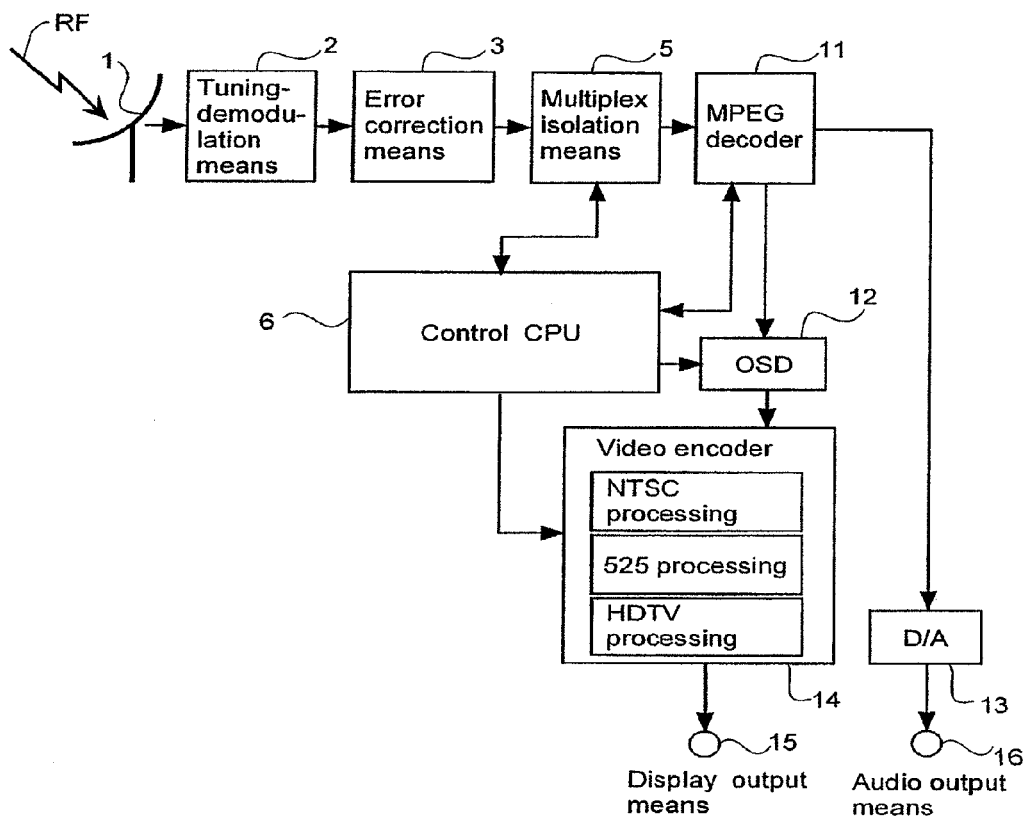

DIGITAL BROADCAST RECEIVER UNIT

CROSS REFERENCE TO RELATED APPLICATION

This is a continuation of U.S. application Ser. No. 13/022,971, filed Feb. 8, 2011, which is a continuation of U.S. application Ser. No. 12/196,640, filed Aug. 22, 2008 (now U.S. Pat. No. 7,889,281), which is a continuation of U.S. application Ser. No. 11/024,874, filed Dec. 30, 2004 (now U.S. Pat. No. 7,436,458), which is a continuation of U.S. application Ser. No. 10/725,456, filed Dec. 3, 2003 (now U.S. Pat. No. 7,173,674), which is a continuation of U.S. application Ser. No. 10/376,231, filed Mar. 3, 2003 (abandoned), which is a continuation of U.S. application Ser. No. 09/135,727, filed Aug. 18, 1998 (now U.S. Pat. No. 6,549,243). This application relates to and claims priority from Japanese Patent Application No. 09-224605, filed on Aug. 21, 1997. The entirety of the contents and subject matter of all of the above is incorporated herein by reference.

BACKGROUND OF THE INVENTION

1. Field of the Invention

This invention relates to a digital broadcast receiver unit, and in particular, relates to a digital broadcast receiver unit capable of receiving, in one stream, multiplex video signals formatted according to a plurality of differing scanning methods.

2. Description of Related Art

In digital transmission technology, in addition to video and audio signals, all kinds of information can be multiplexed and broadcast over one common carrier wave, i.e., multi-channel broadcasts utilizing this technology have already commenced. By utilizing this digital transmission technology, video signals for different scanning methods can be coded, multiplexed (i.e., placed on one common carrier wave) and then broadcast.

In contrast, in related art analog broadcast receivers, television receivers are able to receive transmissions from a plurality of analog broadcast systems. In analog broadcasting, however, different kinds of information cannot be multiplexed (or placed together on the same carrier wave) so that the received video signal itself must be analyzed to determine the scanning method. When receiving different video signals having a plurality of scanning systems in the above mentioned related art analog broadcasts, not only was a custom identification means required to analyze and process the received video signal itself, but in order to identify the video signal, video signal processing circuits had to be operated whose operation was not actually necessary.

In contrast, one important feature of digital broadcasting, however, is that a plurality of information such as audio, video and data can be multiplexed and sent as one transmission stream. Utilizing multiplexed data therefore means that various features can be provided.

SUMMARY OF THE INVENTION

In view of the above problems, it is therefore an object of this invention to provide a digital broadcast receiver for identifying video signal scanning methods utilizing different kinds of multiplexed information, and using such identification for selecting an appropriate scanning method for reproduction.

In order to achieve the above, this invention is directed to a digital broadcast receiver unit for receiving a digital multiplexed signal stream having multiplexed signals commonly encoded using a same encoding/decoding standard, the multiplexed signals including video signals corresponding to a plurality of different video signal formats, and isolating and reproducing at least one video signal, the unit including: a selector to select and extract one video signal from a received the digital multiplexed signal; a decoder to decode the video signal from the selector according to the encoding/decoding standard; a plurality of video processor sections, with respective video processor sections providing video processing according to a different video signal format of the plurality of different video signal formats; and a controller using information from the received the digital multiplexed signal to determine a video signal format of the video signal from the decoder, and selecting one video processor section of the video processor sections to perform video processing of the video signal according to a determined video signal format thereof. More particularly, the present invention determines the scanning method of the video signal of the selected program and then performs the appropriate processing based on the scanning method for the selected video signal.

The foregoing and a better understanding of the present invention will become apparent from the following detailed description of the preferred embodiments and claims when read in connection with the accompanying drawings, all forming a part of the disclosure hereof this invention. While the foregoing and following written and illustrated disclosure focuses on disclosing embodiments of the invention which are considered preferred embodiments, it should be clearly understood that the same is by way of illustration and example only and is not to be taken by way of limitation, the spirit and scope of the present invention being limited only by the terms of the appended claims.

BRIEF DESCRIPTION OF THE DRAWING(S)

The following represents brief descriptions of the drawings, wherein:

FIG. 1 shows a block diagram of the first embodiment of this invention;

FIGS. 2A-C are drawings showing exemplary configurations of the digital multiplex stream;

FIG. 3 is a block diagram showing the configuration of a second embodiment of this invention;

FIGS. 4A-B are drawings showing the configuration of a digital multiplex stream, and a flowchart showing scanning information packet processing, respectively;

DETAILED DESCRIPTION OF THE PREFERRED EMBODIMENTS OF THE INVENTION

Figure 1:
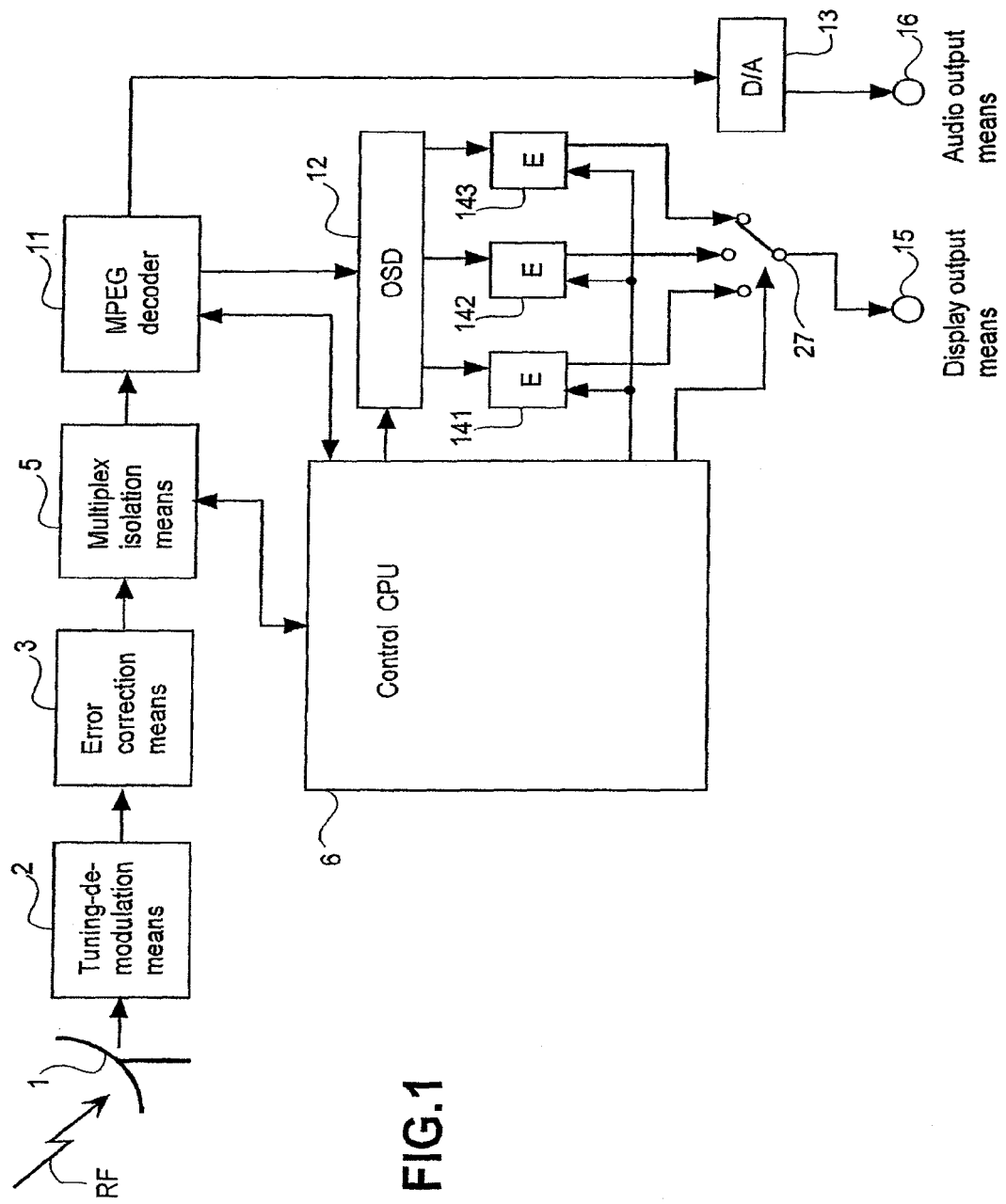

Before beginning a detailed description of the subject invention, mention of the following is in order. When appropriate, like reference numerals and characters are used to designate identical, corresponding or similar components in differing figure drawings.

Hereafter, the embodiment of this inventions will be explained while referring to the accompanying drawings. FIG. 1 is a block diagram showing the structure of the digital broadcast receiver of this invention. An RF carrier wave sent from a communications satellite (not shown) is received at an antenna 1 and then processed by other components. More particularly, in FIG. 1, the numeral 1 denotes the antenna, the numeral 2 is a tuning-demodulation means, the numeral 3 is an error correction means, the numeral 5 is a multiplex isolation means for treating a multiplexed signal, the numeral 6 is a control CPU, the numeral 11 is an MPEG decoder for decoding the coded audio and video information. Also in FIG. 1, the numeral 12 is an OSD (On Screen Display) circuit for adding character information to video signals output from the Moving Picture Experts Group (MPEG) decoder 11, the numeral 13 is a D/A converter for converting digital audio signals into analog signals. Further, in FIG. 1, the numeral 141 is a video encoder, for instance, to convert 525 interlaced scanning lines of an NTSC system signal into an analog signal and add synchronizing information, etc. The numeral 142 is a video encoder, for instance, to convert 525 scanning lines of a sequential scanning 525 progressive signal (hereafter abbreviated to 525P signal) into an analog signal and add synchronizing information, etc. The numeral 143 is a video encoder, for instance, to convert the 1080 interlaced scanning lines of an HDTV system signal into an analog signal and add synchronizing information, etc. The numeral 15 in the same figure is a video signal output terminal, the numeral 16 is an audio signal output terminal, and the numeral 27 is an output selection means.

The signal received by the antenna 1 is tuned and demodulated by the tuning-demodulation means 2. The demodulated signal from the tuning-demodulation means 2 is output to the error correction means 3. Error correction based on the addition of an error correction code is then performed by the error correction means 3. Next, according to control provided by the CPU 6, a signal of a program for viewing is demultiplexed (isolated from the other signals) and output by the multiplex isolation means 5.

The coded audio data and coded video data isolated by the multiplex isolation means 5 is applied to the MPEG decoder 11. The MPEG decoder 11 decodes the coded data into the digital signal that was present prior to MPEG coding, i.e., according to control provided by the CPU 6. The digital video signal output from the MPEG decoder 11 is applied to the OSD means 12 which adds character information according to control by the CPU 6, and is sent to the video encoders 141, 142 and 143 which each convert the digital video signal into an analog video signal, again, according to control by the CPU 6. As a parallel operation, the digital audio signal output from the MPEG decoder 11 is applied to the D/A converter 13, and converted to an analog audio signal. The output from the video encoders 141, 142 and 143 is applied to the selection means 27, wherein an appropriate one of the outputs from the video encoders 141, 142 and 143 is selected via control by the control CPU 6, and the selected video signal is output. This process allows the analog video signal and analog audio signal sent from the transmitting side to be played back and output in parallel to the video signal output terminal 15 and the audio signal output terminal 16, respectively.

The operation when processing video signals for different broadcast systems was explained above. FIG. 2A shows the structure of one unit of the multiplexed signal referred to as a transport stream packet (hereafter TS packet). The TS packet is comprised of a payload for storing data (e.g., video, audio and other info.), a header for indicating data such as identification (e.g., packet number) and/or scanning approach (e.g., NTSC, PAL, etc.) data, and an error correction check bit for performing error correction. As shown in FIG. 2B, in a digital broadcast, multiplexing of video signals in one stream for a plurality of differing scanning methods can be performed. FIG. 2C shows (without headers and error correction check bits) a state of a TS packet in the case where an NTSC signal and an HDTV signal are multiplexed as one example. As is apparent from such Fig., video signals of different scanning systems do not have to be alternately or periodically provided, but instead, can be provided in any order.

When the viewer selects the desired program from such signals, e.g., through any know remote or switch arrangement (not shown), the multiplex isolation means 5 responds thereto, and only the coded audio data and the coded video data that comprises the selected program is isolated and output from the multiplex isolation means 5. The coded video data and coded audio data which is output is applied to the MPEG decoder 11. The coded video data includes data detailing the scanning method. The MPEG decoder 11 detects the data detailing the scanning method from the input coded data and conveys this data to the control CPU 6. Based on the information conveyed from the MPEG decoder 11, and the determination of the present scanning method, the CPU 6 (via suitable software programming) controls the video encoders 141, 142 and 143, as well as control of the selection means 27. Thus, only the video encoder matching the video signal selected from among the video encoders 141, 142 and 143 is utilized and an analog video signal is output from the selection means 27.

As explained previously, operation of the video encoders 141, 142 and 143 based on information on the scanning method detected by the MPEG decoder 11 of this invention and the selection means 27 not only allows processing and output of the signal for the correct scanning method, but also allows shutting off of the power to video encoders not currently needed and to stop their operation so that useless expenditure of unnecessary power and generation of unnecessary heat is prevented. Further, the generation of signal interference is also reduced.

Figure 9:
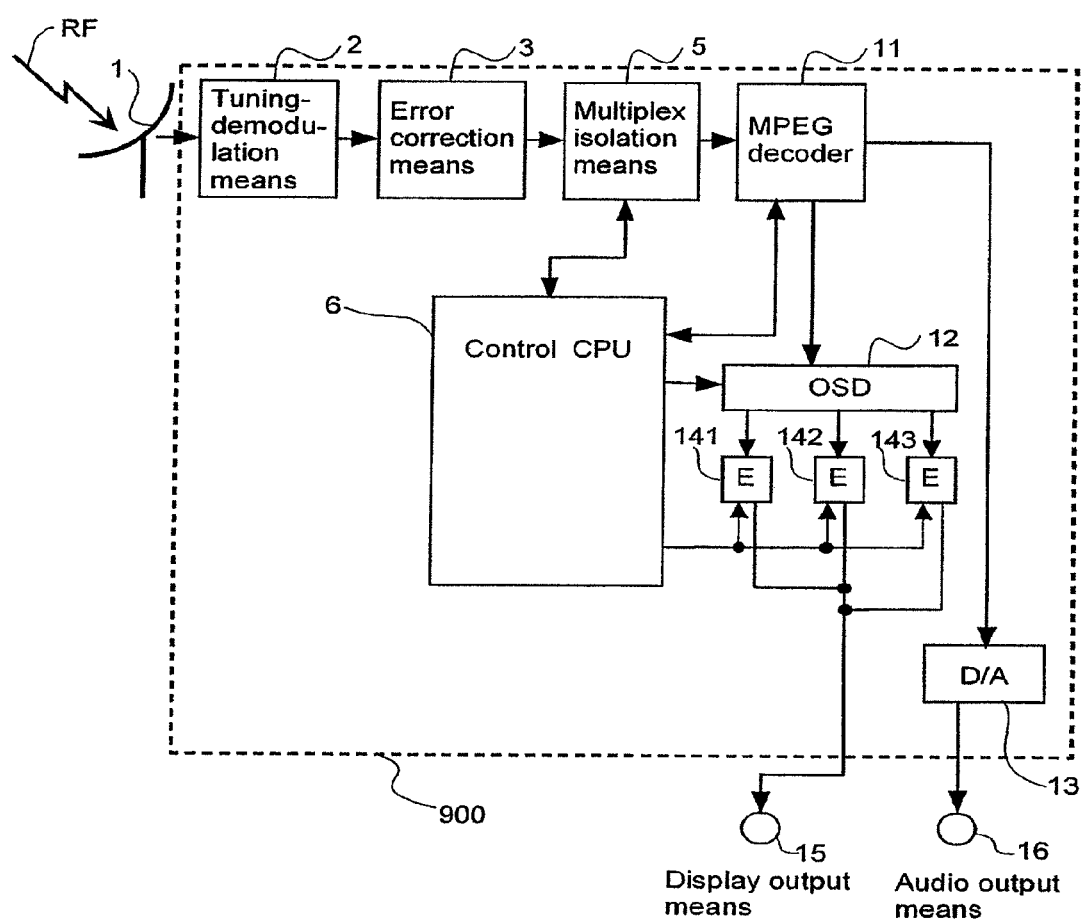
FIG. 9 shows a different block diagram showing of this invention.
Figure 10:
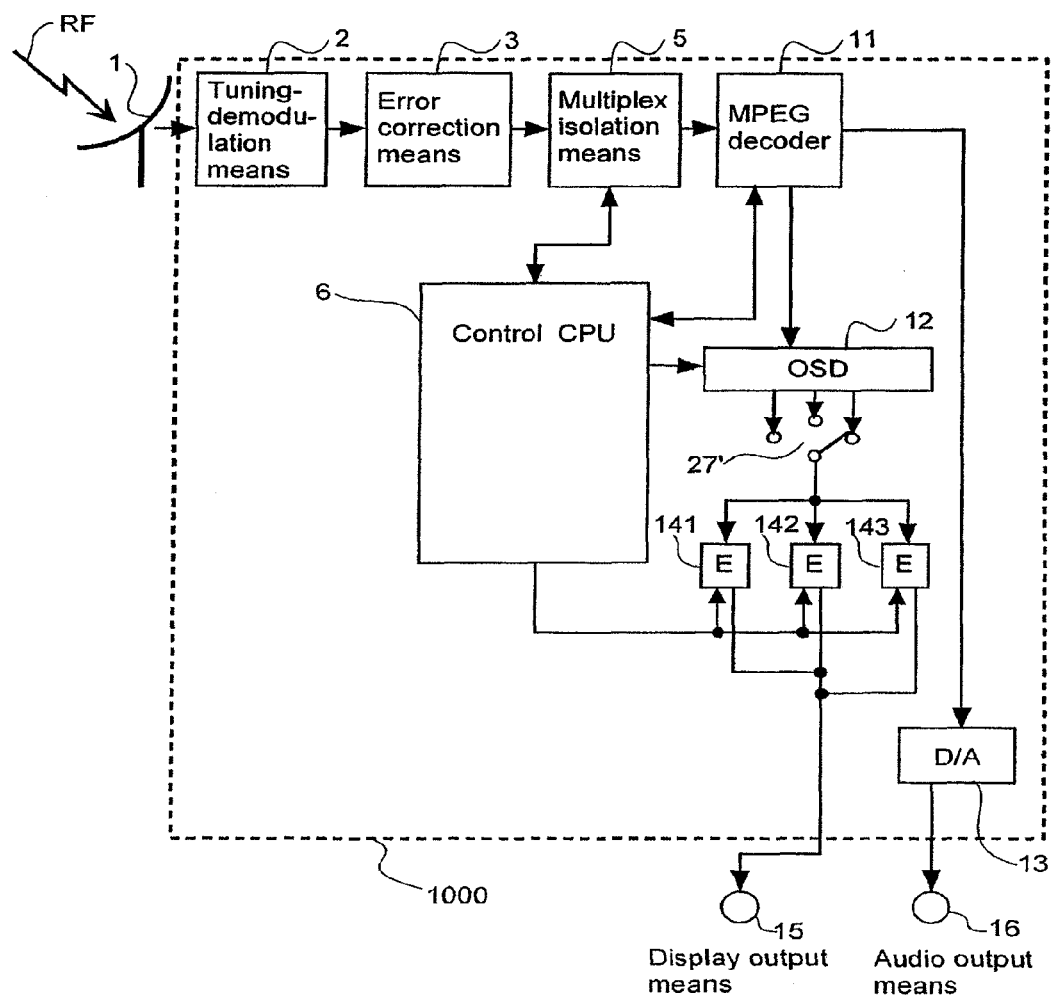
FIG. 10 shows an another different block diagram showing of this invention.

Additionally, although in FIG. 1 there is illustrated a configuration in which a signal having a system corresponding to each of the video encoders 141, 142 and 143 is inputted, it may also be applicable that signals of all the types of scanning systems are connected in common from the same terminal to the video encoders 141, 142 and 143 as shown in FIG. 9 (implemented a self-contained unit 900, e.g., a set-top box), and thereby the controlling CPU 6 controls in such a way that only the circuit coinciding with the scanning system of an input signal in the video encoders 141, 142 and 143 is operated. In addition, as shown in FIG. 10 (implemented as a self-contained unit 1000, e.g., set-top box), a signal output terminal of each of the scanning systems is connected to the switch 27' so that the switch 27' is controlled by the controlling CPU 6, whereby an output terminal of the OSD means 12 coinciding with a video scanning system of a selected TV program is selected, and the signal is inputted to the video encoder. Concurrently, only the video encoder corresponding to the inputted video signal may be allowed to operate under the control of the CPU 6. As described above, either configuration shown in FIGS. 9 and 10 provides an effect similar to that exhibited by the configuration shown in FIG. 1.

The second embodiment of this invention is next explained while referring to FIG. 3. Reference numeral 14 in FIG. 3 denotes a video encoder. The embodiment of FIG. 3 differs from the embodiment of FIG. 1 in that the configuration of the video encoder 14 is a singular circuit, e.g., a sub-processor, etc., which versatilely permits processing of any of the NTSC signals, 525 signals or HDTV signals. More particularly, the video encoder 14 can be provided as a sub-processor or singular application specific-integrated circuit (ASIC) chip, having segregated processing sub-programs or processing areas which can be selectively enabled/disabled to permit processing according to an appropriate scanning method. While the FIG. 1 approach of separately provided encoders has the power saving advantage that unneeded encoders can be powered down, a FIG. 3 software implemented approach has the advantage that the encoder 14 can be easily changed/customized via simple software reprogramming. The control CPU 6 operates the video encoder 14 so as to match the scanning method detected by the MPEG decoder 11 with any of the three previously related processing means based on information conveyed from the MPEG decoder 11.

More specifically, for instance, video filter parameters which limit the available video band are regulated. In addition, in FIG. 3, the video encoder 14 may be constructed to have a configuration where a parameter is fixed in such a way that it may be adapted only for a predetermined kind of video signal. Alternatively, the parameter may be constructed to have a configuration that it is not fixed by the video encoder 14 by itself, but an optional value is selected by the controlling CPU 6. For the configuration when the fixed parameter is selected, it is possible to simplify the control to be carried out by the controlling CPU. In the case of the configuration in which an optional value is selected by the controlling CPU 6, it is possible to cope with video signals of all known scanning systems. With such an arrangement as above, the video signal inputted to the video encoder 14 is correctly encoded and outputted from the output terminal 15 as an analog video signal. This process allows the signals input to the video encoder 14 to be sent from the output terminal 15 as correctly encoded analog video signals. As explained above, processing of signals for the correct scanning method can be performed since this invention controls the video encoder 14 according to the appropriate scanning method, based on information on the scanning method detected by the MPEG decoder 11.

Figure 4B:
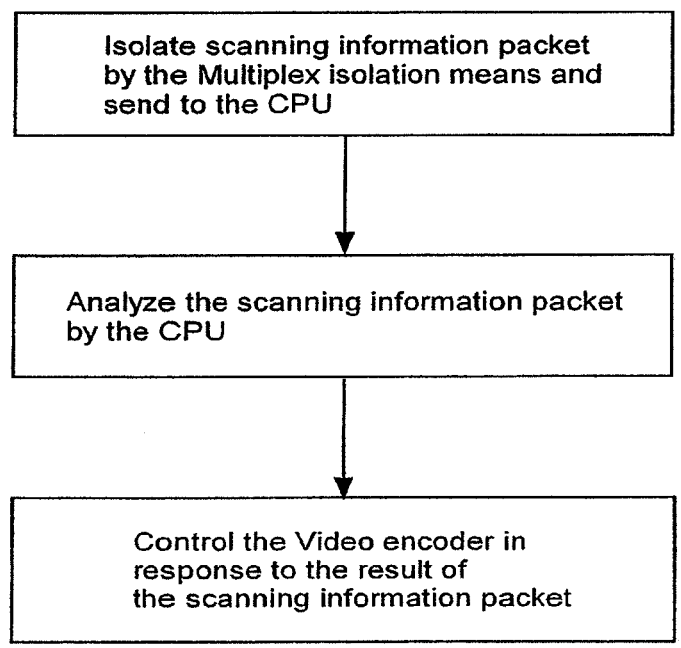

The embodiments in FIGS. 1 and 3 showed examples of detection with an MPEG decoder 11 of scanning method data containing coded image data. However, as shown for example in FIG. 4A, when there is a TS packet holding data showing the scanning method for each video signal in the payload, the data in the TS packet listing the scanning methods can be isolated by means of the above multiplex isolation means 5, and conveyed to the control CPU 6 for subsequent use in control of the selection means 27 and the video encoder. A flowchart of this process is shown in FIG. 4B. Even in this case, the results will clearly be the same as when detecting the scanning method with the MPEG decoder 11.

Figure 5:
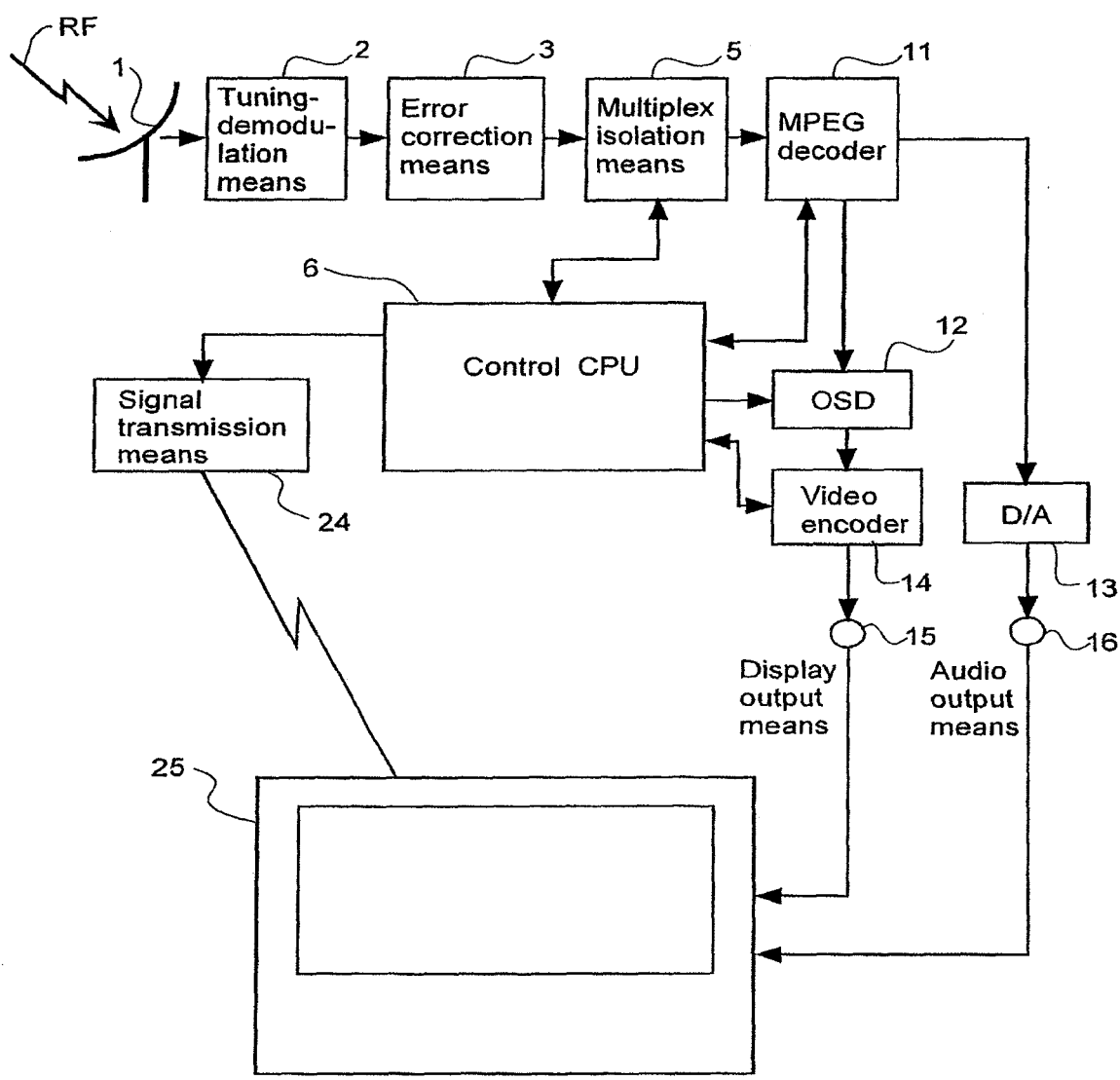
FIG. 5 is a block diagram showing the configuration of a third embodiment of this invention.

The third embodiment of this invention is shown in FIG. 5. The embodiment of FIG. 5 differs from the embodiment of FIG. 1 for instance, in that a signal transmission means 24 is provided for sending a signal to a television receiver, e.g., an infrared signal. This signal transmission means 24 sends an infrared signal derived from information from the MPEG decoder 11, and such infrared signal contains information indicating the scanning method of the video signal. This arrangement for instance allows the scanning method of the video signal detected by the MPEG decoder 11 to be conveyed to a television receiver 25 having a means to receive the aforementioned infrared signal and also able to handle a plurality of scanning methods (e.g., a multi-sync or multi-scan capable television receiver), when this television receiver 25 is connected to the video signal output terminal 15. The scanning method of the video signal for the television receiver 25 is therefore switched to match the scanning method output from the video signal output terminal 15 so that a viewer need not provide and/or manually manipulate a separate scanning method switcher.

FIG. 5 showed an example using an infrared signal as a signal transmission means 24, however this invention is not limited to this method and an RF waveform signal sending means may also be utilized to send an RF carrier wave signal without an infrared signal. A television receiver provided with this RF waveform signal receiving capability and connected to the video signal output terminal 15 will achieve the same effect of the invention.

Figure 6:
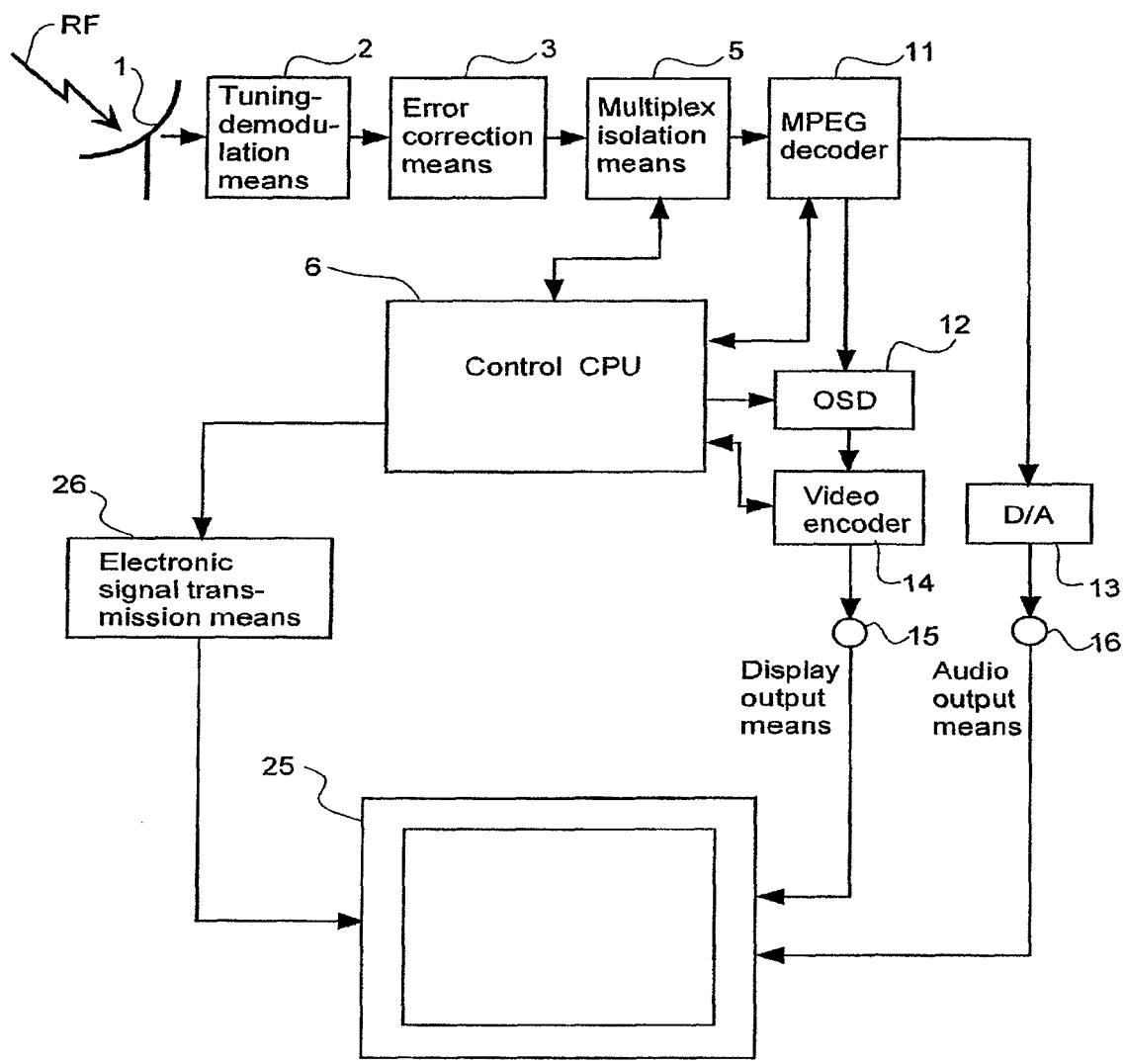
FIG. 6 is a block diagram showing the configuration of a fourth embodiment of this invention.

FIG. 6 shows the fourth embodiment of this invention. The embodiment of FIG. 6 differs from the embodiment of FIG. 5 in that rather than using a wireless signal such as infrared to show the scanning method of the video signal, an electrical signal is instead conveyed by a wire utilizing an electrical or electronic signal transmission means 26. Using the configuration in FIG. 6 will clearly achieve the same effect of the invention as in the embodiment of FIG. 5.

Figure 7:
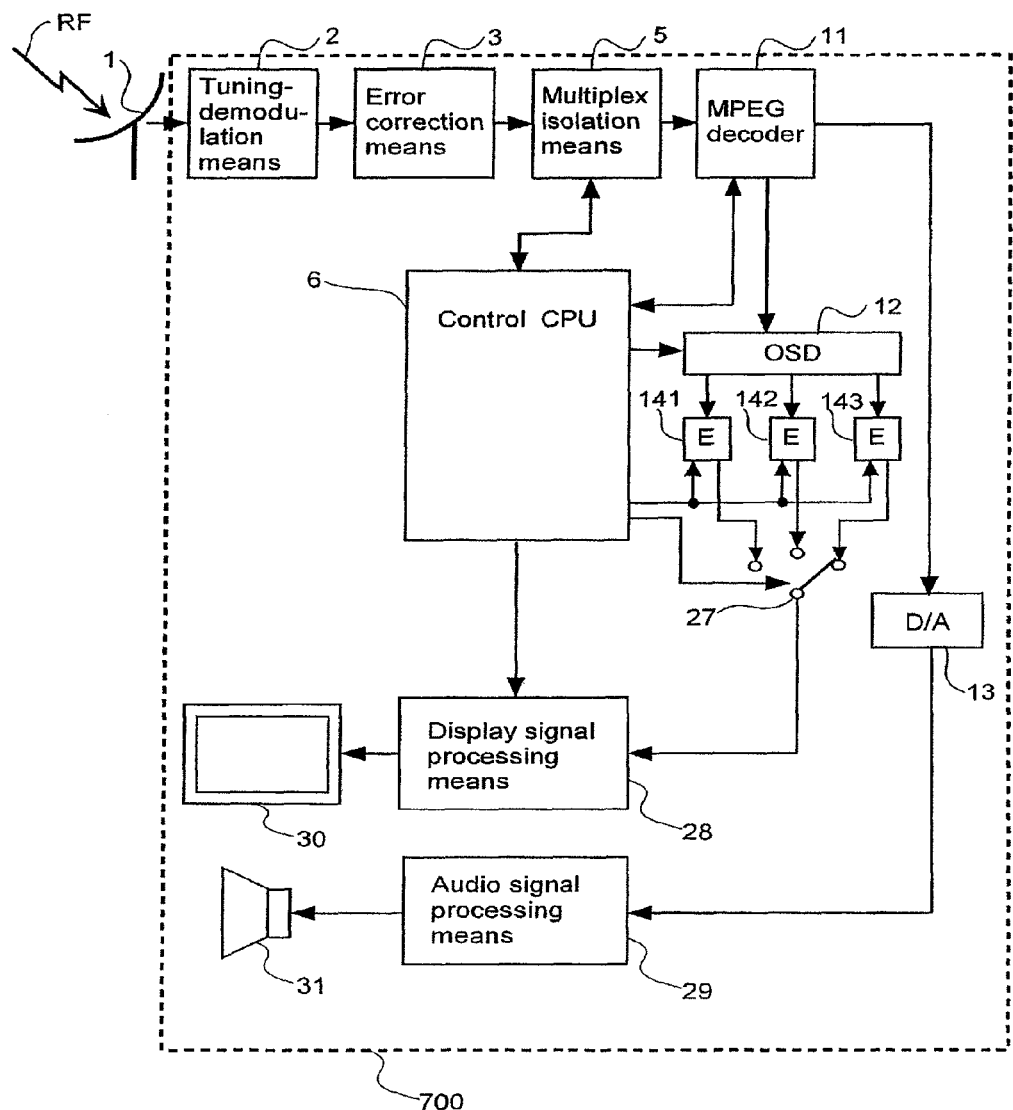
FIG. 7 is a block diagram showing the configuration of a fifth embodiment of this invention.

A fifth embodiment of the invention is shown in FIG. 7. The embodiment of FIG. 7 differs from the embodiment of FIG. 1 in that the digital broadcast receiver of this invention is housed in a same cabinet 700 with a display unit, or in other words, this embodiment comprises a television with an internal digital broadcast receiver unit. In FIG. 7, the reference numeral 28 denotes a display signal processing means, 29 denotes an audio signal processing means, 30 denotes a display means such as a CRT or liquid crystal display panel or a plasma display panel, and 31 denotes an audio signal output means such as a speaker. In FIG. 7, the display processing means 28 and the display means 30 are configured, for example, so that an NTSC signal, a 525P signal or a HDTV signal can be displayed. Also in FIG. 7, the control CPU 6 detects the video signal scanning method that was selected, operates the video encoders 141, 142 and 143 and along with switching the selection means 27, controls the display processing means 28 and functions to allow processing of video signal scanning method that was detected. This arrangement permits correct processing of the video signal for the program selected by the equipment comprising a television with an internal digital broadcast receiver unit and display of the program by means of the display means 30.

Figure 8:
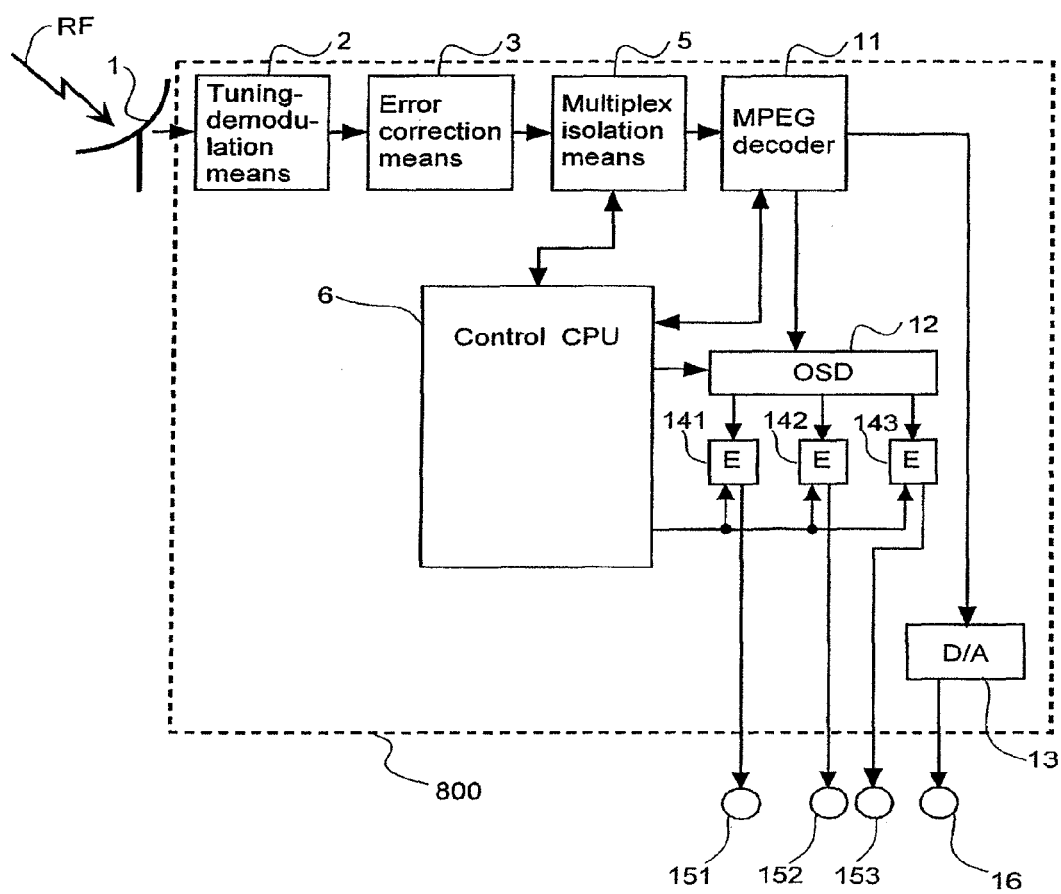
FIG. 8 is a block diagram showing the configuration of a sixth embodiment of this invention.

The sixth embodiment of this invention is shown in FIG. 8 (implemented as a self-contained unit 800, e.g., set-top box). FIG. 1 shows a configuration in which the selector means 27 selects and issues an output from the video encoders 141, 142 and 143. As shown in FIG. 8, however, the sixth embodiment differs in that the selection means 27 is not used and the output from the video encoders 141, 142 and 143 are respectively output from separate output terminals 151, 152 and 153. Using the configuration in FIG. 8 will clearly achieve the same effect of the invention as in the embodiment of FIG. 1.

Figure 11:
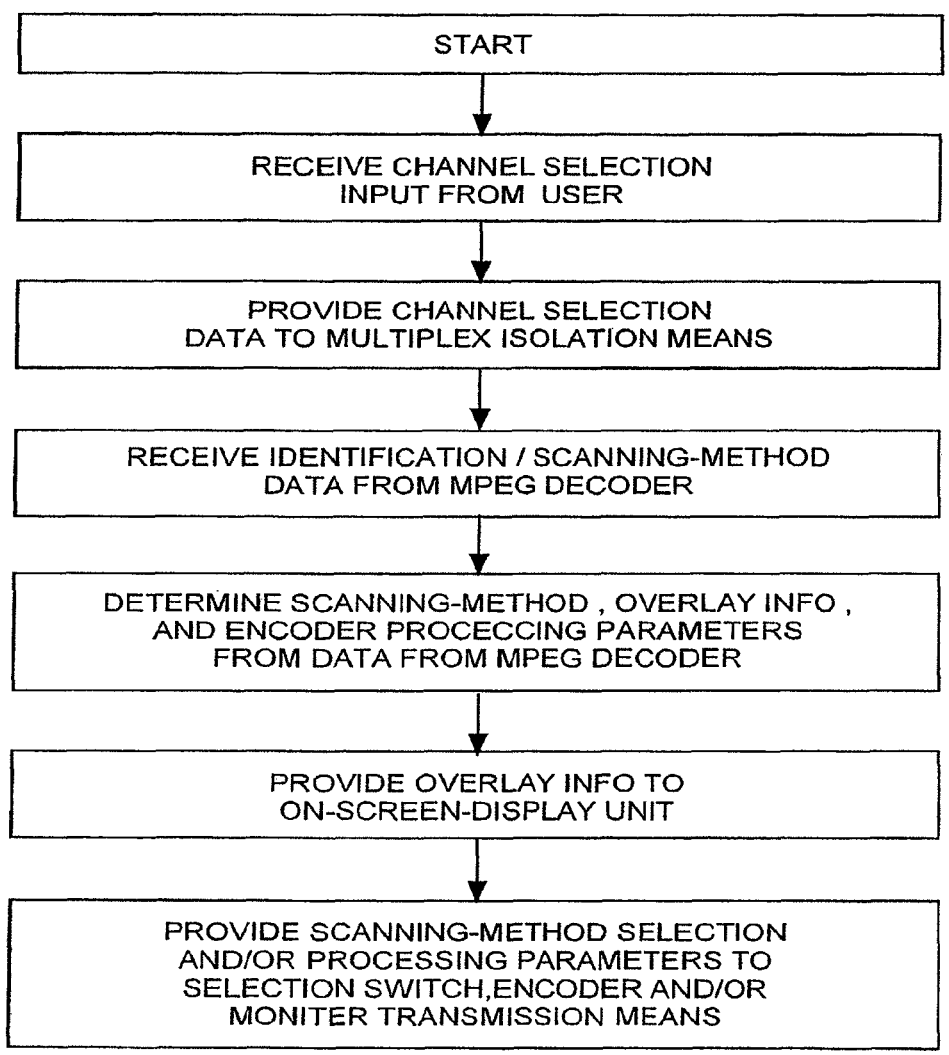
FIG. 11 is a flowchart indicative of exemplary processing operations conducted by an application specific integrated circuit (ASIC) or central processing unit (CPU) with respect to the present invention, e.g., via suitable programming.

FIG. 11 is a flowchart indicative of exemplary processing operations conducted by the CPU 6 with respect to the present invention, e.g., via suitable programming. Such operations are repetitively performed over time.

In the above explanation, the RF carrier wave received by the antenna 1 was sent from an artificial satellite however needless to say, this invention is also applicable in cases where the RF carrier wave is sent from an antenna installed on a ground device. Further, the above explanation described an example of digital broadcast receiver compatible with the three scanning methods consisting of an NTSC signal, a 525P signal and an HDTV signal. However the same effect of the invention can be obtained with a configuration in which other video signal scanning methods are handled by a compatible MPEG encoder or video encoder. Further, as technology advances further approaches/methods applicable for use with the present invention will be found.

In the digital broadcast receiver of this invention as explained above therefore, video signals can be correctly played back and output even when a plurality of video signals of different scanning methods are received as multiplexed signals in one stream.

This concludes the description of the preferred embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A digital broadcast receiving apparatus comprising:
a receiver capable of receiving digital multiplexed signals including video signals of at least three different video programs encoded using an encoding/decoding standard in one transport stream, video signal formats of the video signals including a plurality of different video signal formats having different combination of the number of scan lines and a scan method;
an isolator to isolate a video signal of one video program to be viewed from the digital multiplexed signals;
a decoder to decode the video signal from the isolator according to the encoding/decoding standard;
a processor to execute a plurality of video processing sub software programs, with respective video processing sub software programs providing video processing according to a different combination of the number of scan lines and a scan method of the plurality of different video signal formats;
a controller using information obtained from the digital multiplexed signal to determine a combination of the number of scan lines and a scan method of the video signal decoded by the decoder, and selecting one video processing of the video processing sub software programs to perform video processing for the video signal decoded by the decoder according to the determined combination of the number of scan lines and the scan method; and
a display to display a video signal processed by the processor.

2. An apparatus as claimed in claim 1, wherein the plurality of different video signal formats include at least a video signal format having the number of scan lines which is more than 525 lines and a video signal format having the number of scan lines which is less than or equal to than 525 lines.

3. An apparatus as claimed in claim 1, wherein
the three different video programs include a program whose video signal has a video signal format having the number of scan lines which is more than 525 lines, and the three different video programs include programs whose video signals have a video signal format having the number of scan lines which is less than or equal to 525 lines.

4. An apparatus as claimed in claim 1, wherein the isolator, the decoder, the processor, and the controller, are housed in the same cabinet with the display.

5. An apparatus as claimed in claim 1, wherein the digital multiplexed signals include a data indicating the combination of the number of scan lines and a scan method of the video signal, and the controller obtains the data from the digital multiplexed signal as the information to determine the combination of the number of scan lines and a scan method of the video signal of the video program to be viewed.

6. An apparatus as claimed in claim 2, wherein the digital multiplexed signals include a data indicating the combination of the number of scan lines and a scan method of the video signal, and the controller obtains the data from the digital multiplexed signal as the information to determine the combination of the number of scan lines and a scan method of the video signal of the video program to be viewed.

7. An apparatus as claimed in claim 3, wherein the digital multiplexed signals include a data indicating the combination of the number of scan lines and a scan method of the video signal, and the controller obtains the data from the digital multiplexed signal as the information to determine the combination of the number of scan lines and a scan method of the video signal of the video program to be viewed.

8. An apparatus as claimed in claim 4, wherein the digital multiplexed signals include a data indicating the combination of the number of scan lines and a scan method of the video signal, and the controller obtains the data from the digital multiplexed signal as the information to determine the combination of the number of scan lines and a scan method of the video signal of the video program to be viewed.

9. A digital broadcast receiving apparatus comprising:
a receiver capable of receiving digital multiplexed signals including video signals of at least three different video programs encoded using an encoding/decoding standard in one transport stream, video signal formats of the video signals including a plurality of different video signal formats having different combination of the number of scan lines and a scan method;
an isolator to isolate a video signal of one video program to be viewed from the digital multiplexed signal;
a decoder to decode the video signal from the isolator according to the encoding/decoding standard;
a plurality of video processor sections, with respective video processor sections providing video processing according to a different combination of the number of scan lines and a scan method of the plurality of different video signal formats;
a controller using information obtained from the digital multiplexed signal to determine a combination of the number of scan lines and a scan method of the video signal decoded by the decoder, and selecting one video processor section of the video processor sections to perform video processing of the video signal decoded by the decoder according to the determined combination of the number of scan lines and the scan method; and
a display to display a video signal processed by the processor section.

10. An apparatus as claimed in claim 9, wherein the plurality of different video signal formats include at least a video signal format having the number of scan lines which is more than 525 lines and a video signal format having the number of scan lines which is less than or equal to than 525 lines.

11. An apparatus as claimed in claim 9, wherein
the three different video programs include a program whose video signal has a video signal format having the number of scan lines which is more than 525 lines, and
the three different video programs include programs whose video signals have a video signal format having the number of scan lines which is less than or equal to 525 lines.

12. An apparatus as claimed in claim 9, wherein the isolator, the decoder, the processor sections, and the controller, are housed in the same cabinet with the display.

13. An apparatus as claimed in claim 9, wherein the digital multiplexed signals include a data indicating the combination of the number of scan lines and a scan method of the video signal, and the controller obtains the data from the digital multiplexed signal as the information to determine the combination of the number of scan lines and a scan method of the video signal of the video program to be viewed.

14. An apparatus as claimed in claim 10, wherein the digital multiplexed signals include a data indicating the combination of the number of scan lines and a scan method of the video signal, and the controller obtains the data from the digital multiplexed signal as the information to determine the combination of the number of scan lines and a scan method of the video signal of the video program to be viewed.

15. An apparatus as claimed in claim 11, wherein the digital multiplexed signals include a data indicating the combination of the number of scan lines and a scan method of the video signal, and the controller obtains the data from the digital multiplexed signal as the information to determine the combination of the number of scan lines and a scan method of the video signal of the video program to be viewed.

16. An apparatus as claimed in claim 12, wherein the digital multiplexed signals include a data indicating the combination of the number of scan lines and a scan method of the video signal, and the controller obtains the data from the digital multiplexed signal as the information to determine the combination of the number of scan lines and a scan method of the video signal of the video program to be viewed.

17. A digital broadcast receiving apparatus comprising:
a receiver capable of receiving digital multiplexed signals including video signals of different video programs including at least a first video program, a second video program, and a third video program, the video signals of the different video programs are encoded using an encoding/decoding standard in one transport stream, video signal formats of the video signals including a plurality of different video signal formats having different combination of the number of scan lines and a scan method, wherein the number of scan lines of the video signal of the first video program is more than 525 lines, and the number of scan lines of the video signals of the second video program and the third video program is less than or equal to 525 lines;
an isolator to isolate a video signal of one video program to be viewed from the digital multiplexed signals;
a decoder to decode the video signal from the isolator according to the encoding/decoding standard;
a processor to execute a plurality of video processing sub software programs, with respective video processing sub software programs providing video processing according to a different combination of the number of scan lines and a scan method of the plurality of different video signal formats;
a controller using information obtained from the digital multiplexed signal to determine a combination of the number of scan lines and a scan method of the video signal decoded by the decoder, and selecting one video processing of the video processing sub software programs to perform video processing for the video signal decoded by the decoder according to the determined combination of the number of scan lines and the scan method; and
a display to display a video-signal processed by the processor.

18. An apparatus as claimed in claim 17, wherein the isolator, the decoder, the processor, and the controller, are housed in the same cabinet with the display.

19. An apparatus as claimed in claim 17, wherein the digital multiplexed signals include a data indicating the combination of the number of scan lines and a scan method of the video signal, and the controller obtains the data from the digital multiplexed signal as the information to determine the combination of the number of scan lines and a scan method of the video signal of the video program to be viewed.

20. An apparatus as claimed in claim 18, wherein the digital multiplexed signals include a data indicating the combination of the number of scan lines and a scan method of the video signal, and the controller obtains the data from the digital multiplexed signal as the information to determine the combination of the number of scan lines and a scan method of the video signal of the video program to be viewed.

21. A digital broadcast receiving apparatus comprising:
a receiver capable of receiving digital multiplexed signals including video signals of different video programs including at least a first video program, a second video program, and a third video program, the video signals of the different video programs are encoded using an encoding/decoding standard in one transport stream, video signal formats of the video signals including a plurality of different video signal formats having different combinations of the number of scan lines and a scan method, wherein the number of scan lines of the video signal of the first video program is more than 525 lines, and the number of scan lines of the video signals of the second video program and the third video program is less than or equal to 525 lines;
an isolator to isolate a video signal of one video program to be viewed from the digital multiplexed signal;
a decoder to decode the video signal from the isolator according to the encoding/decoding standard;
a plurality of video processor sections, with respective video processor sections providing video processing according to a different combination of the number of scan lines and a scan method of the plurality of different video signal formats;
a controller using information obtained from the digital multiplexed signal to determine a combination of the number of scan lines and a scan method of the video signal decoded by the decoder, and selecting one video processor section of the video processor sections to perform video processing of the video signal decoded by the decoder according to the determined combination of the number of scan lines and the scan method; and
a display to display a video signal processed by the processor section.

22. An apparatus as claimed in claim 21, wherein the isolator, the decoder, the processor sections, and the controller, are housed in the same cabinet with the display.

23. An apparatus as claimed in claim 21, wherein the digital multiplexed signals include a data indicating the combination of the number of scan lines and a scan method of the video signal, and the controller obtains the data from the digital multiplexed signal as the information to determine the combination of the number of scan lines and a scan method of the video signal of the video program to be viewed.

24. An apparatus as claimed in claim 22, wherein the digital multiplexed signals include a data indicating the combination of the number of scan lines and a scan method of the video signal, and the controller obtains the data from the digital multiplexed signal as the information to determine the combination of the number of scan lines and a scan method of the video signal of the video program to be viewed.

25. A digital broadcast receiving apparatus comprising:
a receiver capable of receiving digital multiplexed signals including video signals of at least three different video programs encoded using an encoding/decoding standard in one transport stream, video signal formats of the video signals including a plurality of different video signal formats having different combination of the number of scan lines and a scan method, a difference between the different video signal formats is at least either the number of scan lines or a scan method;
an isolator to isolate a video signal of one video program to be viewed from the digital multiplexed signal;
a decoder to decode the video signal from the isolator according to the encoding/decoding standard;
a plurality of video processor sections, with respective video processor sections providing different video processing;
a controller using information obtained from the digital multiplexed signal to determine a video signal format of the video signal decoded by the decoder, and selecting a video processor section among the video processor sections which provide video processing to the decoded video signal having the determined video signal format; and
a display to display a video signal processed by the video processor sections,
wherein the video processing by the selected video processor section is included in video processing processes to change the video signal having the determined video signal format into a video signal which can be displayed in the display.

26. An apparatus as claimed in claim 25, wherein the three different video programs include a program whose video signal has a video signal format having the number of scan lines which is more than 525 lines, and
the three different video programs include programs whose video signals have a video signal format having the number of scan lines which is less than or equal to 525 lines.

27. A digital broadcast receiving apparatus comprising:
a receiver capable of receiving digital multiplexed signals including video signals of at least three different video programs encoded using an encoding/decoding standard in one transport stream, video signal formats of the video signals including a plurality of different video signal formats having different combination of the number of scan lines and a scan method, a difference between the different video signal formats is at least either of the number of scan lines or a scan method;
an isolator to isolate a video signal of one video program to be viewed from the digital multiplexed signal;
a decoder to decode the video signal from the isolator according to the encoding/decoding standard;
a plurality of video processor sections, with respective video processor sections providing different video processing;
a controller using information obtained from the digital multiplexed signal to determine a video signal format of the video signal decoded by the decoder, and selecting a video processor section among the video processor sections which provide video processing to the decoded video signal having the determined video signal format; and
a display to display a video signal processed by the video processor sections.

28. An apparatus as claimed in claim 27, wherein the three different video programs include a program whose video signal has a video signal format having the number of scan lines which is more than 525 lines, and
the three different video programs include programs whose video signals have a video signal format having the number of scan lines which is less than or equal to 525 lines.

29. A digital broadcast receiving apparatus comprising:
a receiver capable of receiving digital multiplexed signals including video signals of at least three different video programs encoded using an encoding/decoding standard in one transport stream, video signal formats of the video signals including a plurality of different video signal formats having different combination of the number of scan lines and a scan method;
an isolator to isolate a video signal of one video program to be viewed from the digital multiplexed signal;
a decoder to decode the video signal from the isolator according to the encoding/decoding standard;
a plurality of video processor sections, with respective video processor sections providing different video processing;
a controller capable of determining a combination of the number of scan lines and a scan method of the video signal decoded by the decoder, and selecting a video processor section among the video processor sections which perform video processing of the decoded video signal; and,
a display capable of displaying a video signal processed by the video processor sections,
wherein
in the case that a video program to be viewed is changed from the one video program to another video program, the isolator, the decoder, and the controller operate in such a manner that:
the isolator isolates a video signal of the another video program;
the decoder decodes a video signal of the another video program; and
the controller selects another video processor section if at least either of the number of scan lines or a scan method of the video signal of the another video program is different from that of the one video program.

30. An apparatus as claimed in claim 29, wherein the three different video programs include a program whose video signal has a video signal format having the number of scan lines which is more than 525 lines, and
the three different video programs include programs whose video signals have a video signal format having the number of scan lines which is less than or equal to 525 lines.

31. A digital broadcast receiving apparatus comprising:
a receiver capable of receiving digital multiplexed signals including video signals of at least three different video programs encoded using an encoding/decoding standard in one transport stream, video signal formats of the video signals including a plurality of different video signal formats having different combination of the number of scan lines and a scan method, a difference between the different video signal formats is at least either of the number of scan lines or a scan method;

an isolator to isolate a video signal of one video program to be viewed from the digital multiplexed signal;

a decoder to decode the video signal from the isolator according to the encoding/decoding standard;

a processor to execute a plurality of video processing sub software programs with respective video processing sub software programs providing different video processing;

a controller using information obtained from the digital multiplexed signal to determine a video signal format of the video signal decoded by the decoder, and selecting a video processing sub software program among the video processing sub software programs to provide video processing to the decoded video signal having the determined video signal format; and a display to display a video signal processed by the processor, wherein the video processing by the processor is included in video processing processes to change the video signal having the determined video signal format into a video signal which can be displayed in the display.

32. An apparatus as claimed in claim 31, wherein the three different video programs include a program whose video signal has a video signal format having the number of scan lines which is more than 525 lines, and the three different video programs include programs whose video signals have a video signal format having the number of scan lines which is less than or equal to 525 lines.

33. A digital broadcast receiving apparatus comprising:

a receiver capable of receiving digital multiplexed signals including video signals of at least three different video programs encoded using an encoding/decoding standard in one transport stream, video signal formats of the video signals including a plurality of different video signal formats having different combination of the number of scan lines and a scan method, a difference between the different video signal formats is at least either of the number of scan lines or a scan method;

an isolator to isolate a video signal of one video program to be viewed from the digital multiplexed signal;

a decoder to decode the video signal from the isolator according to the encoding/decoding standard;

a processor to execute a plurality of video processing sub software programs with respective video processing sub software programs providing different video processing;

a controller using information obtained from the digital multiplexed signal to determine a video signal format of the video signal decoded by the decoder, and selecting a video processing sub software program among the video processing sub software programs to provide video processing to the decoded video signal having the determined video signal format; and a display to display a video signal processed by the processor.

34. An apparatus as claimed in claim 33, wherein the three different video programs include a program whose video signal has a video signal format having the number of scan lines which is more than 525 lines, and the three different video programs include programs whose video signals have a video signal format having the number of scan lines which is less than or equal to 525 lines.

35. A digital broadcast receiving apparatus comprising:

a receiver capable of receiving digital multiplexed signals including video signals of at least three different video programs encoded using an encoding/decoding standard in one transport stream, video signal formats of the video signals including a plurality of different video signal formats having different combination of the number of scan lines and a scan method;

an isolator to isolate a video signal of one video program to be viewed from the digital multiplexed signal;

a decoder to decode the video signal from the isolator according to the encoding/decoding standard;

a processor to execute a plurality of video processing sub software programs with respective video processing sub software programs providing different video processing;

a controller capable of determining a combination of the number of scan lines and a scan method of the video signal decoded by the decoder, and selecting a video processing sub software program among the video processing sub software programs which perform video processing of the decoded video signal; and, a display capable of displaying a video signal processed by the processor, wherein in the case that a video program to be viewed is changed from the one video program to another video program, the isolator, the decoder, and the controller operate in such a manner that:

the isolator isolates a video signal of the another video program;

the decoder decodes a video signal of the another video program; and the controller selects another video processing sub software program if at least either of the number of scan lines or a scan method of the video signal of the another video program is different from that of the one video program.

36. An apparatus as claimed in claim 35, wherein the three different video programs include a program whose video signal has a video signal format having the number of scan lines which is more than 525 lines, and the three different video programs include programs whose video signals have a video signal format having the number of scan lines which is less than or equal to 525 lines.

\* \* \* \* \*